Oct. 24, 1961
D. J. BRIDGEFORD
3,005,728
CELLULOSIC LAMINATES
Filed Oct. 19, 1956
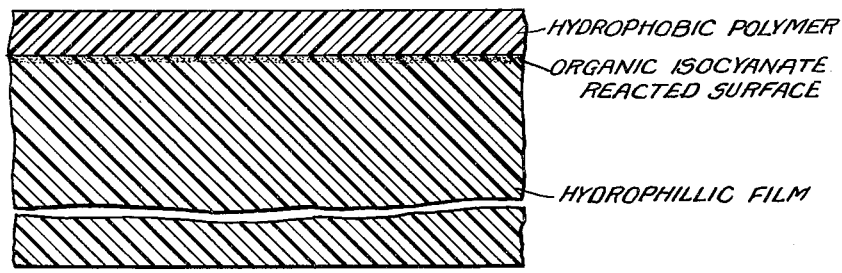
INVENTOR.
Douglas J. Bridgeford,
BY
Brown, Jackson, Boettcher & Dienner
Attys.

United States Patent Office 3,005,728
Patented Oct. 24, 1961

3,005,728
CELLULOSIC LAMINATES
Douglas J. Bridgeford, Chicago, Ill., assignor to Tee-Pak, Inc., Chicago, Ill., a corporation of Illinois
Filed Oct. 19, 1956, Ser. No. 616,934
34 Claims. (Cl. 117—118)

This invention relates to flexible laminates of cellulosic material having a thin coating of hydrophobic polymer bonded to one or both surfaces thereof, and means and methods of forming such laminates.

Although not limited thereto, the invention has wide application to food packaging and particularly in the meat packaging industry where it has become desirable to provide substitute for animal casings used in stuffing sausage meats and the like. Casings formed of animal intestines and like materials have a tendency to stretch and change shape during the stuffing operation, with the result that slices cut from the packaged meat have different and unpredictable diametric dimensions. In this age of pre-packaging, this non-uniformity of size adds serious complications to a desire to provide packages of sliced meat having a constant number of slices as well as weight per package. There is also the ever present problem of resisting spoilage of the packaged meat or other food product.

As a substitute for animal casings, a number of different materials have been developed, most of which are cellulosic, that is, include cellulose, regenerated cellulose, or a cellulose derivative in their composition. One such material is known as cellophane. Another is formed by pressing together cotton linters or other bast fiber product having a high porosity and degree of penetrability for viscose, to form a non-woven sheet which is then impregnated with regenerated cellulose. Casings of such fibrous material are made by using a mandrel, and forming a tube thereabout from a web of the cellulosic fiber and then squirting a stream of viscose between the overlapped plies of the web to form a seam while simultaneously extending viscose around the outside of the tube. The process is completed by passing the formed tube through a coagulating bath, then a regenerating bath and followed by washing and drying of the tube. Thus the tubing may be described as a cellulosic fiber sheet to which has been applied a thin coating or skin or layer or application of viscose regenerated in situ. This material is known in the trade as "fibrous." It has good strength, and by reason of its non-woven character, tends to retain its shape without stretching. However, like other cellulosic films, it has a relatively high oxygen and moisture vapor transmission.

Thus a principal object of the invention is to provide means and methods of treating cellulosic films, whether in sheet or tubing form, to provide a barrier to or at least reduce their oxygen and moisture vapor transmission characteristics.

Another object of the invention is to provide an oxygen and moisture vapor barrier coating for cellulosic films.

Various hydrophobic materials are known which will inhibit the transmission of moisture vapor, among which are vinyl-vinylidene chloride copolymers, such as Saran and vinyl acrylonitrile copolymers, of which the material sold under the trademark "Vinyon" is an example. These materials possess very low moisture transmission characteristics, and furthermore, are also transparent, and, although lacking the strength of the fibrous material, when applied as thin coatings, have been found to possess good flexibility, extensibility and resistance to abrasion, as well as to acids, alkalis and many solvents. A lamination of the two materials should therefore have great utility in combating the problems of shrinkage of the packaged meats through moisture loss and should also delay spoilage because of the barrier it forms to oxygen penetration.

However, the general inertness of such materials coupled with the fact that the cellulosic base is hydrophilic and contains active hydrogen while the protective polymer is hydrophobic and does not contain active hydrogens in its molecular structure has seriously hampered attempts to bond the two dissimilarly constituted materials. The problem of bonding is further complicated by the fact that the laminated product must retain an exceedingly pliable and flexible nature, under both dry and wet conditions, without separating to be useful as casing material into which sausage meat and the like may be stuffed.

It is therefore a principal object of the present invention to provide a flexible lamination in which a hydrophobic resin or polymer is strongly bonded to a cellulosic base and method of forming the same.

A further object of the invention is to provide a sausage casing embodying flexible fibrous sheet material coated with a thin layer of a hydrophobic polymer to provide a moisture vapor and oxygen barrier for the cellulosic material without materially affecting the other properties of the cellulosic material, such as its strength and flexibility.

Still another object is to provide means and methods of strongly bonding thin layers of hydrophobic polymer including the copolymer of vinylidene chloride and vinyl chloride, vinylacrylonitrile copolymer and other synthetic thermoplastic resins which do not contain active hydrogens, but are characterized in having great flexibility and resistance to alkalies, acids and solvents, including water.

The invention in its broader aspects is however not limited to the bonding of such active hydrogen free polymers to cellulosic films and thus a further and broader object of the invention is to provide means and method of modifying the surface characteristics of hydrophilic organic materials which contain active hydrogens whereby thin layers or coatings of various hydrophobic polymers, some of which do and others of which do not contain active hydrogens, will have improved adherence thereto.

Many other objects as well as advantages of the invention will be or will become apparent from the description thereof which follows, and it will be understood that many changes and/or modifications in the described process and resultant laminate may be made, and are intended to be included within the spirit of the invention as defined in the appended claims.

Cellulosic materials, such as the cellophane and fibrous material referred to above, which are conventionally used in forming casings are essentially hydrophilic while the polymeric materials which I desire to bond to the cellulosic base are more nearly hydrophobic. The materials do not have a natural affinity one to the other, and attempts to laminate a thin film of the polymer to the cellulosic base or to coat the surface of the flexible cellulosic sheeting with a solution of the polymer to produce thin layers thereof have generally not been satisfactory, and the polymer layer readily separates, especially in the presence of hot water, as in cooking a food contained in the coated package.

However, in accordance with my invention, I have found that if I treat normally hydrophilic cellulosic sheet material, with a relatively dilute solution of an organic isocyanate, such as stearyl isocyanate or toluene diisocyanate, I can cause a reaction to take place on the surface of the cellulosic material to a superficial depth which is yet sufficient to convert said surface from its normally hydrophilic character to one possessing hydrophobic characteristics (such surface modified films have been found to possess a one-to-five fold less rate of moisture vapor transmission than to the untreated films), and to which modfied surface, thin coatings of the hydrophobic polymer will strongly bond. An example of a lamination in accordance with my invention is illustrated schematically by the figure of the drawing.

Although the proportions of the surface modifying agent which I use may be varied somewhat, as for example between 10 and .0055% by weight of the liquid vehicle, when I treat waterwet regenerated cellulose films as they come from the softener bath, I prefer a 1% solution of an isocyanate, such as toluene diisocyanate. This I dissolve in isopropyl ether or in an equivalent organic solvent which has enough polarity to wet the moist casing while having a very modest soluibility in water. Examples of such other solvents include benzene, toluene, xylene, carbon terachloride, amylacetates, higher ketones, proprietary aliphatic solvents and the like.

Instead of coating from organic solvents, it is also in keeping with the invention to coat from a latex or emulsion of the selected isocyanate. Thereafter, I coat the thus modified surface casing with an organosol dispersion of the hydrophobic polymer. For example, I may coat vinyl chloride-vinylidene chloride copolymer in methylethyl ketone or vinyl acrylonitrile in a similarly compatible organic solvent. After baking at moderate temperature the polymer layer is found to have excellent adherence to the cellulosic base.

Tests to check the adherence of the polymer coating to such modfied cellulosic surfaces indicated that a maximum only 1 or 2% of the coating would be removed after a three hour tap water boil test. The laminate remains flexible and transparent with little or no disclora tion. Storage of the laminate at −30° F. for a period of one week followed by flexing and crumpling does not give rise to cracks that can be seen through a low power microscope.

One of the important characteristics and advantages of films coated according to the present invention is that very little, if any, free isocyanate groups are left in the surface after the baking. It is therefore possible for the films to be treated with the isocyanate and then stored for several months before coating. Adherence is apparently obtained through chemisorption forces and thus distinguishes over prior art processes wherein relatively thick layers of polyisocyanates have been used as an adhesive to chemically bond two films together.

For best adherence, the "hydrophobicity" of the resulting undercoated cellulosic, film is controlled in accordance with the hydrophobic character of the selected polymer coating. Through the proper choice of reagent or concentration of the reagent in the solvent, and the extent to which the undercoating reaction is allowed to penetrate into the cellulosic film a modfied surface may be produced having an immediate water contact angle varying all the way from 30° to 140°. For example meta-nitrophenyl isocyanate when used to undercoat cellulose will give an undercoated film with a moderate degree of water repulsion as indicated by an immediate contact angle with water of 50–70 degrees. Diisocyanatodiphenylmethane, on the other hand, even when used from a solvent in trace quantities, gives rise to a waxlike surface with a water contact angle of over 90 degrees.

Although the invention is not limited to superficial modification of the cellulosic film, this is highly desirable from a point of economy of materials, and also to avoid deleteriously changing the essential properties of the undercoated film. Under ordinary circumstances it is possible to obtain effective bonding where the modification of the surface of the cellulosic film is so restricted in depth as to be accompanied by an increase in film weight of 0.1–0.001%.

Confining of the undercoating or reaction process to the surface area of the cellulosic film can be accomplished in any one of several ways:

(a) The isocyanate may be applied to the cellulosic film by methods that ensure a very thin film of the isocyanate. These methods include application by offset from a roll, doctor rods or blades applied with thin spacing, printing, use of fine aerosols of the pure compound or solutions, dusting, and numerous other methods known to the art.

(b) The isocyanate may be applied mixed with relative volatile solvent whereby the solvent evaporates before the isocyanate has had time to diffuse to any extent into the cellulosic body.

(c) The isocyanate may be applied to the cellulose film with a solvent that has a low miscibility with water or other liquid contained in the body of the cellulosic film. Such solvents include benzene, toluene, carbon tetrachloride, higher ketones, ethers, ester, and the like. For example, when using tolylene 2,4-diisocyanate for undercoating, a given water drop contact angle on the cellulose film (say 80 degrees) can be obtained from a solution of 0.25% in toluene and 1.0% in diisopropyl ether. Generally, as the water miscibility of the solvent decreases, the undercoating reactions are restricted to a very thin outer layer of the cellulosic film.

(d) The isocyanate that is used as the reactant may be selected to have a low solubility in the liquid within the cellulosic film or to have a molecule size so large that it cannot easily diffuse into the gel phase of the cellulosic material. Examples of isocyanate so characterized includes diisocyanathodiphenylmethane and triiocyanatotriphenylmethane. Also, some of the polyurethanes with isocyanate functions at both ends of the molecule are too large to diffuse appreciably into the cellulosic film, particularly when it is air dry.

The undercoating or surface modifying process is considered to involve the formation of cellulose urethanes on the surface of the film, as well as the formation of several by-products in various ratios dependent on their relative reactivity. Thus, in treating cellulose containing water with a reactive monoisocyanate, undoubtedly the main by-products are ureas of low molecular weight while when treating the same film with a di-isocyanate, both monomeric and polymeric ureas of various molecular weights are formed. When both water and glycerol, or water and other active hydrogen containing materials are present, deposition of both polymeric ureas and polymeric urethanes will occur in the surface of the cellulosic film. Although the hydrophobicity that normally arises on the surface of the cellulose film is due in part to the formation of cellulose urethanes and in part to the deposition of these by-products, best adhesion seems to require the formation of the compound with cellulose. This is borne out by the fact that good adhesion of the polymer coating can be obtained with dry glycerol-free cellulose films which have been undercoated with a monoisocyanate, for example.

In treating moist casings, concentrations of up to 1.11 percent of the isocyanate are to be preferred because of the possibility of losses through dissolution and/or reaction with the larger amounts of water present in the film. However, when treating dry casings with isocyanates dissolved in such water immiscible solvents as toluene and carbon tetrachloride, sufficient hydrophobic cellulose surfaces can be obtained with reagent concentrations as low as 0.05 percent. Dry casings will ordinarily contain 20 to 25% glycerol and 5 to 8% water. Thus the incidence of side reactions in addition to the cellulose urethane formation will be less than when the wet gel film which contains at least 50% water is used. Preferably the concentration of isocyanate should be sufficient to produce a thickness of the isocyanate-reacted cellulose on the cellulosic film or sheet which roughly approximates 0.008 mil.

Although the examples, thus far, have been limited to the use of toluene diisocyanate and stearyl isocyanate, a relatively wide range of mono-, di- or tri-isocyanates and related isothiocyanates can be reacted with the cellulosic surfaces to provide adhesion for the coating to be subsequently applied. Thus for example, diisocyanatodiphenylmethane may be used. This has a higher ratio of aromatic hydrocarbon to polar isocyanate groups than has toluene diisocyanate and its reaction with cellulose provides greater hydrophobicity. Moreover, its lower water solubility permits a greater restriction of the reaction to the surface of the cellulosic film or casing which is desirable both from an economy of material as well as the low toxicity level it permits in the final product. Preferably, such a material is used in a solution of 150 parts per million to 600 parts per million in a toluene-isoamyl acetate solvent mixture. Fibrous casing thus treated when coated with 0.4 to 0.6 mil coatings of saran resin showed good adhesion to the casings after a three-hour tap water boil.

Alpha-naphthyl isocyanate is also useful when suitably diluted in a relatively water-immiscible organic vehicle as aforedescribed to convert or modify the surface of a cellulosic film and obtain strong adherence of a hydrophobic polymer coating thereto. In utilizing this particular isocyanate to bond a coating of a copolymer of vinyl chloride and acrylonitrile existing in an 80:20 ratio such as sold under trademark "Vinyon N," it has been found preferable to use a 0.1% solution while it is preferable to use an 0.6% solution when it is desired to bond saran to a fibrous sheet.

Although the invention has thus far been largely confined to a discussion of the modification of the surface of regenerated cellulose or fibrous material, it should be understood that the invention is applicable to that class of active hydrogen containing hydrophilic materials which include, in addition to the afore mentioned cellulosic materials, cellulose and substituted cellulose derivatives, paper, cotton, wool, silk, zein, polyvinyl butyral, amylose and the like.

Likewise, although the invention has particular importance in improving adherence of polymer coatings not containing active hydrogens to hydrophilic films, the invention is not so limited, and a large variety of materials including those that do and those that do not contain active hydrogens may be caused to have improved adherence to cellulosic films or to other hydrophilic hydrogen containing material following the teachings of the present invention. Examples of coating materials in addition to those previously mentioned include chlorinated rubber, polyethylene, wax and/or polyethylene-modified cellulose nitrate, cellulose acetate, or ethyl cellulose. Also rubber hydrochloride and vinyl copolymers, such as vinyl chloride-acetate resins which are available commercially in various proportions.

In general, reactants with which the surface of such cellulosic materials are treated will include organic compounds such as the aforementioned mono-di-, and polyisocyanates, which contain a plurality of —X=C=Y groups wherein X is —C or N and Y is O, S or NR wherein R is hydrogen or mono-valent hydrocarbon radicals. The preferred classes are aromatic isocyanates, such as toluene 2,4-diisocyanate and 2,6-diisocyanate; alkyl aryl isocyanates such as diisocyanatodiphenylmethane or triisocyanatotriphenylmethane; aliphatic isocyanates, such as stearyl isocyanate; aromatic isocyanates, such as alpha-naphthyl isocyanate, or phenyl isothiocyanate; substituted aromatic isocyanates, such as meta-nitrophenyl isocyanate; aromatic-aliphated isocyanates substituted urethane such as the reaction product of two moles of toluene diisocyanate with one of ethylene glycol or of two moles of toluene diisocyanate with one of hexamethylene glycol; isocyanate substituted ureas such as the reaction product of two moles of toluene diisocyanate with one of ethylenediamine; isocyanate substituted aromatic ureas such as the reaction products of two moles of toluene diisocyanate with one of p-phenylenediamine; or trisubstituted urethanes such as glycerol reacted with three moles of toluene di-isocyanate. Also useful are 2-biphenyl isocyanate, 4-biphenyl isocyanate, n-butyl isothiocyanate, 2,5-dichlorophenyl isocynaate-o-ethoxyphenyl isocyanate, p-ethoxy phenyl isocyanate, 2-methoxyphenyl isocyanate, o-nitrophenyl isocyanate, p-bromophenyl isocyanate, o- and m-chlorophenyl isocyanate, ethyl isocyanate, ethyl isothiocyanate, m-nitrophenyl isothiocyanate, phenylisothiocyanate, phenyl isocyanate, beta-naphthylisocyanate, o-, m-, and p-, tolyl isocyanate. Mixtures of the aforementioned may also be used.

In addition, other isocyanates and isothiocyanates, including vinylarylisocyanates of U.S. Patent No. 2,468,716, the propenyl isocyanates of U.S. Patent No. 2,325,287, the alkyloxyphenyl isocyanate polymers or copolymers of U.S. Patent No. 2,647,884, the alkyl isocyanates-ethyl acrylate copolymer of U.S. Patent No. 2,537,064, the alkyd-unsaturated isocyanates described in U.S. Patent No. 2,503,209, reaction products of bis phenol and isocyanates of U.S. Patent No. 2,594,979, diisocyanate modified polyesters containing an excess of isocyanate groups, polyisocyanate-modified active hydrogen containing rubber, also ethylene diisocyanate, tetramethylene, diisocyanate, hexamethylene diisocyanate, decamethylene diisocyanate, 2,3-dimethyl-tetramethylene diisocyanate or diisothiocyanate and propylene-1,2, butylene-1,2 and butylene-1,3 derivatives of diisocyanate and diisothiocyanate, toluene diisocyanate, diphenylmethane diisocyanate and triphenyltriisocyanate. Other exemplifying aromatic polyisocyanates and isothiocyanates include m-phenylene, p-phenylene, xylyene-1,4 and -1,3; 1-methylphenylene-2,4; naphthlene - 1,4; benzene - 1,2,4 triisothioyanate; 5 - nitro-1,3 phenylene diisocyanate; 4,4'-diphenylenepropane diisocyanate, and anisole polyisocyanate.

Operative alkylidene derivatives include ethylidene diisocyanate, heptylidene diisocyanate and heptylidene isothiocyanate, for example. Aliphatic-aromatic compounds include phenylethylene diisocyanate, styrene diisocyanate, allyloxyphenyl isocyanate and the like. Cycloalkylene derivatives include cyclopentylene diisocyanate, 1,4-diisocyanatocyclohexane, cyclohexylene-1,2-diisothiocyanate and the like.

Polyisocyanates and isothiocyanates which include hetero atoms, for example, 1,2,3,4-tetraisocyanatobutane, 2-chloro-1,3-diisocyanatropropane, $$SCN(CH_2)_3S(CH_2)_3NCS,$$

and the like.

The following more specific examples are illustrative of the process:

Example I

An approximately one percent emulsion of octadecyl isocyanate in water was made by adding five milliliters of the isocyanate to about 480 milliliters of water, rapidly stirring in a Waring Blendor and then adding approximately 0.2 gram of Atlas "Tween 60" emulsifier. This emulsifier is polyoxyethylene sorbitan monostearate. The emulsion was stable against creaming for at least three days.

This emulsion was used to dip-coat a casing of fibrous material with a contact time of 0.2 to 0.4 second. The moist casing was then dried for five minutes at 100° C. The casing still had a hydrophilic surface after the treatment but it was coated with saran. The treated film was dip-coated in an eight percent solution of 200-centipoise resin in 3:1 tetrahydrofuran: acetone mixture. This coated casing was air dried over the weekend and then dried at 120° C. for thirty minutes. The somewhat wrinkled casing was cut into about five-inch cylinders, slit and boiled in tap water for three hours. The six pieces were blotted and one-inch wide "Texcel" pressure sensitive tape was applied and immediately ripped off. The estimated average of tests on both directions of the casing was about 30 percent removal.

Example II

An additional batch of 300 milliliters of emulsion was made by weighing out three grams of the octadecyl isocyanate and adding to it 0.1 gram of the "Tween 60" with mixing. This mixture was then slowly added to most of the water and rapidly stirred in a Waring Blendor. The beaker was washed out with the remainder of the water. An apparently stable emulsion was formed. A fibrous casing was pretreated with this emulsion and then coated with saran as in Example I. Similar adherence results were obtained. The isocyanate-treated casing was much more hydrophobic than that produced in Example I.

By "adherence" as opposed to "adhesion" is meant the measure of the attraction between the two surfaces under the particular method of testing where the elongation of the coating, the rate of application of force and the nonplanar nature of the surface to which the coating is applied all obscure the inherent attraction between the coating and substrate. "Adhesion," on the other hand, is the attraction between two surfaces when the separating force is applied normal to them. It is applied fast enough so that little elongation of the coating occurs and the interface of the coating and substrate is essentially plane.

Example III

Toluene diisocyanate was made as a 1.11 percent solution in practical grade diisopropyl ether. Dry fibrous casing was dip-treated in this solution for 0.5 second. Heating the treated film at 120° C. for three minutes resulted in a hydrophobic surface which required about ten minutes for a drop of water to penetrate. The treated film was dip-coated in an 8 percent solution of 200 centipoise saran resin in 3:1 tetrohydrofuran acetone mixture. The thus coated casing was air dried over a weekend and heated to 120° C. for 30 minutes. The casing was subsequently cut up into five-inch cylinders, slit and boiled in tap water for three hours. The pieces were blotted and one-inch Texcel pressure sensitive tape was applied and immediately ripped off. Average removal of the coating was about 5 percent.

Example IV

A coating tower was utilized which allowed four legs of casing to pass through it with the aid of idler rolls and one drive roll at the exit end. The length of the casing in the cabinet is about 40 feet. The temperature of the heating banks at the first leg of the casing travel was controlled to about 5° F. The casing passes up-leg from the coating tank and wiper rods for about nine feet before it encounters the first roller. An improvised flash bake apparatus was inserted below the cabinet between the second and third legs of the casing. This consisted of two hot plates facing each other with the casing passing up between them so that it did not come in contact with a roller for about ten feet of travel. The temperature of the hot plates was variable.

Untreated fibrous casing was first used for the coating trials to find the conditions required to obtain an essentially solvent-free Saran film. Fibrous casing was passed through an 8% solution of Saran resin in methyl ethyl ketone and given a light wipe. The solution had a viscosity of 18.2 seconds in a General Electric No. 2 Zahn cup. Casing was passed through the cabinet at 3.88 feet per minute with the heater banks set at 245–255° F. The flash bake set-up was arranged so that the middle of the air gap was at 145° C. and the actual temperature of the casing passing through was about 120–125° C. Solvent odor was noted at the flash bake so that some must have been removed at this point. After preliminary difficulty in tracking and other adjustments in the cabinet a uniform casing was obtained.

Adherence of the approximately 0.1 mil Saran coating was tested by boiling five-inch, slit-open cylinders of the casing in tap water and testing with Scotch tape as previously described. While no sloughing was noted the coating was completely removed by the tape.

Example V

The conditions of Example IV were maintained except that the fibrous casing was passed through the coating cabinet at 9.46 feet per minute. This casing was given the tap water boil and adherence tests. The coating became cloudy shortly after immersion in the boiling water and sloughed off in about ten minutes.

Example VI

The coating cabinet temperature was increased to the range of 285 to 295° F. between the heater banks of the first leg. Fibrous casing was coated as before and passed through the cabinet at 9.46 feet per minute. When the uniformly coated casing was boiled in tap water and its adherence tested no sloughing took place, but the coating was completely removed by the pressure sensitive tape.

Example VII

A 1.11 percent solution of toluene diisocyanate in diisopropyl ether was prepared. This solution was placed in a five-inch by six-inch area stainless steel tank six inches tall which had a wooden roller one inch from the bottom. Well-wiped fibrous casing was passed directly from the glycerol softener tank into the experimental tank with an immersion time of two seconds. A wiper rod set-up was situated about ten inches from the surface of the liquid of the tank. The casing was passed into the slack boxes and then through the dryer. The casing was heated at an air temperature of 205° F. for six and a half minutes. The resulting film was somewhat hydrophobic in that a drop of water placed on it at the dry end of the dryer spread about 40 percent less than on the control and required about ten minutes to wet through. About 280 feet of this surface-modified film was made together with 200 feet of unmodified control film. It was noted that the solution of the diisocyanate left from the test became cloudy in about three hours from the start of the test. A substantial amount of precipitate settled in about one day.

Fibrous casing which had been treated with the toluene diisocyanate solution was given an approximately three-inch dip in an eight percent solution of Saran in methyl ethyl ketone and given a light wipe. It was then passed at 9.46 feet per minute through the cabinet which was held at 290° F. The surface temperature of the casing at the flash bake was about 256° F. The casing was immediately tested for coating adhesion as usual. The coating resulting from the cabinet was uniform in appearance while that from the three-hour tap water boil was slightly cloudy on one side of the flat casing. The two-sidedness was caused by running the casing closer to one heater bank than the other. Residual solvent in the polymer coating that was not completely dried decreased its adhesion to the undercoated cellulosic film.

It was noted that the coating was removed completely from the side which had a cloudy appearance but not more than one to two percent of the coating area under the Scotch tape was removed from the other side. In each of the present experiments the coating tower was operated for from fifteen to twenty minutes so that reasonable assurance was present that equilibrium obtained. This was done because of the large temperature gradient in the cabinet which required time for establishment.

Example VIII

Samples of the coated casing from Example VII were placed in a freezer at about −30° C. and were held there one week. While still in the deep freeze the ends of one-foot long pieces were grasped and twisted and crumpled. Under a low power microscope no cracks could be seen in the coating.

In the above examples the fibrous casings had been made somewhat hydrophobic by reacting them as a wet gel film with a dilute solution of toluene diisocyanate in diisopropyl ether while in the following examples a dry glycerol-containing film was reacted with the isocyanate undercoating reagent. In these latter examples, the coating tower as described in Example IV was utilized and the fibrous casings were made hydrophobic by undercoating them with a one percent solution of 2,4-toluene diisocyanate in either n-amyl acetate or diisopropyl ether. Undercoating was accomplished at ten feet per minute. The Saran resin was coated on fibrous casings at rates as high as thirteen feet per minute and cabinet heaters banked at 340° F.

Weight-loss storage tests made on liver sausage stuffed in casings coated with about 0.12 mil Saran resin indicated losses of from 2.30 percent to 6.70 percent for a seven-day storage, whereas uncoated liver sausage lost about 16.5 percent in weight. It was further noted that the Saran coated liver sausage remained pink in color.

*Example IX*

A fibrous casing in air dry state was made somewhat hydrophobic by passing it for six seconds into a one percent solution of toluene 2,4-diisocyanate in n-amyl acetate. The casing was then passed through the coating tower at 9.46 feet per minute to give a reaction time of about four minutes. About 400 feet was undercoated with heater banks of the coating tower set at 150° F. About 100 additional feet of casing was produced with the tower held at 205° F.

*Example X*

The solvent for the 2,4-toluene diisocyanate was changed to diisopropyl ether. A one percent solution of the isocyanate was made up in the more water-soluble and lower-boiling solvent. Using this solution, about 1000 feet of fibrous casing was undercoated at 9.46 feet per minute and 150° F. About 150 feet of casing was also undercoated at 205° F.

*Example XI*

The concentration of toluene diisocyanate in the diisopropyl ether was increased to two percent and about 500 feet of casing was undercoated at 150° F. It was noted that both solvents wet the dry casing. Furthermore, the diisopropyl ether seemed to penetrate the casing as evidenced by liquid inside. The n-amyl acetate did not penetrate. After the casing was running in the diisopropyl ether for a few hundred feet the penetration was not so evident. All treatment conditions used made the cellulose hydrophobic in that a drop of water placed on it did not immediately spread and it required about five minutes to wet the casing or soak partly in. The immediate "contact angle" of water on the casing was about 60°.

*Example XII*

As a control, casing from the same reel as was undercoated above was coated with Saran resin but without the hydrophobic undercoating. The casing was coated for about a 20-minute period at speeds of 3.88 and 9.46 feet per minute with the heater banks in the cabinet set at 250° F. The actual surface temperature of the casing passing through the flash bake was 120 to 125° C. It was noted that the casing was tacky at the flash bake. In both cases the coating did not slough off in the adhesion test but it was easily removed by rubbing.

*Example XIII*

The same eight percent solution of Saran resin in methyl ethyl ketone which had been used to coat the control casing was used to coat casing which had been made hydrophobic by reaction with two percent solution of toluene diisocyanate dissolved in diisopropyl ether. About 200 feet of undercoated casing was coated from the 24-centipoise Saran solution without wipe rods. The casing was passed through the coating tower at 9.46 feet per minute at a heater bank temperature of 290° F. Attempts to remove the coating with one-inch wide Scotch tape after a three-hour tap water boil resulted in only two to three percent removal. It was noted that the small areas removed were those in which the coating film was cloudy.

*Example XIV*

The conditions of Example XIII were followed except that the flash bake was set so that the casing surface was at 145 to 150° C. The flash bake in the case of both Examples XI and XII was for three seconds. The casing was slightly browned but appeared to be uniformly coated. Scotch tape removed one to two percent of the coating after the three-hour water boil.

*Example XV*

The conditions of Example XIV were followed except that the speed of passage of undercoated casing through the cabinet was increased to 13 feet per minute. Some offset on the idler rollers at the top of the heater banks was noted and some scratches were noted on one edge of the casing. It was concluded that the temperature was too low for this rate of speed.

The temperature was increased to 325° F. and more coated casing was produced. About 13 minutes of casing production was coated. This casing had been undercoated with two percent toluene diisocyanate solution. Fibrous casing which had been undercoated with a one percent toluene diisocyanate solution now passed through the cabinet and was coated. The coating did not appear scratched although an occasional small blister was noted about an inch from the edge of the casing. No more than five percent of the area of either of the films could be removed with Scotch tape after a three-hour water boil.

The casings produced in these examples were stuffed with liver sausage, and it was observed that, although a 0.12 mil Saran resin coated casing stuffed with liver sausage lost an average of 0.57 percent of weight per 24 hours which was too great a weight loss, this could be remedied by approximately doubling the thickness of the Saran polymer layer. It was, however, noted that even a 0.12 mil film of Saran resin afforded enough protection from oxygen that the liver sausage remained pink at least one week while the control became brown through the outer quarter inch of circumference and grey on the inside. The above weight loss was carried out at temperature of 54 to 58° F. showing a 0.4 percent per day loss using Saran coated casings as against 2.23 percent per day weight loss for uncoated casings.

*Example XVI*

A titanium dioxide loaded casing undercoated with toluene diisocyanate was used for coating with 1000 centipoise Saran resin solution. The casing was dipped into a 15 percent solution of Saran in methyl ethyl ketone, given a medium wipe with coarse doctor rods and passed at 6.17 feet per minute into the tower. The coating dope had a Zahn No. 3 cup viscosity of 28.2 seconds or about 250 centipoises. The coating tower heater banks were at 300° F. with the second leg travel at 220° F. The casing in the six seconds flash bake between the second and third leg was held at 150° C.

It was noted during the first 15 minutes of production that bubbles formed in the coating, especially along the edges. Reducing the temperature to 290° F. did not reduce the number of bubbles so the Saran concentration in the dope was reduced to about 14 percent and viscosity was reduced to about 200 centipoises. While blisters were not completely eliminated by these changes, they were greatly minimized.

A total of 50 minutes of production was reeled and a sample of coated casing under the latter conditions was taken for cutting into 20-inch pieces for stuffing.

Portions of the Saran coated casing were boiled in tap water for three hours. There was no sloughing. The coating could not be rubbed off but Scotch tape removed it completely. The Saran coating was removed in small shreds with difficulty by scratching. The casing removed with Scotch tape was slightly turbid and showed some particles of Titanox embedded in the resin film. Part of the coating of the casing had crocked and this superficial pigment contributed to relatively poor coating adhesion. Thickness measurements were made on coating removed from the casing by embrittlement of the casing with concentrated hydrochloric acid over night. The thickness was measured with the Carson Electronic Micrometer on those areas of the film which did not reproduce a "washboard" or rippled surface from the casing. Additional measurements were made on a coating stripped from Saran-coated fibrous which had not been undercoated. Thickness ranged from 0.25 to 0.32 mil with an average of 0.3 mil.

Five liver sausages stuffed into the casings averaging 0.25 to 0.23 mils in thickness of Saran resin coating were discovered to have lost an average of 0.15 percent per day in weight over a 17-day storage period. At the end of the storage period all sausages were pink over 99.5% of the areas. A few browned areas were noted as also a few green molds on the ends of the sausages. The odor was still good.

While the coating could be removed with Scotch tape after a three-hour tap water boil this may not represent a smaller adhesion than that obtained with the 0.14 mil Saran coating. The thicker coating may permit greater grab from the plasticizer of the adhesive on the test Scotch tape. However, the adhesion of the thicker Saran coating is adequate for stuffing and cooking. Liver sausage stuffed in 0.3 mil Saran coated casings lost only 0.15 percent of weight per day when stored at 15° F. and remained pink essentially free from mold for at least 17 days at said temperature.

*Example XVII*

This is an example of the use of p,p′diisocyanatodiphenylmethane (DDM) as the surface modifying reagent. About 2.4 grams of p,p′diisocyanatodiphenylmethane was ground in a mortar and sifted into 300 milliliters of isoamyl acetate which was held at 70° C. About 100 milliliters of toluene was added and the mixture was stirred five minutes. About half the solid dissolved. When the solution was cooled to room temperature most of the solid precipitated. The supernatent liquid was decanted and used for reaction with cellulose surfaces. Later large scale solubility tests showed that the 3:1 isoamyl acetate-toluene solution dissolved 600 to 620 parts per million of active material.

The dilute solution was placed in an evaporating dish and four foot lengths of fibrous casing were dipped through it with a contact time of 0.2 to 0.4 second. The casings wet with the solution were placed for a few minutes in front of the hood, then they were heated three minutes at 135° C. The casings obtained a waxlike surface which water showed no signs of wetting in five minutes. Water drops began to soak through after 25 minutes.

The saturated solution of diisocyanatodiphenylmethane was diluted 1:1 (v./v.) with isoamyl acetate and additional pieces of casing were treated. This 300 parts per million solution also gave hydrophobicity.

A 150 parts per million and a 75 parts per million solution were also prepared by diluting the saturated solution in 3:1 isoamyl acetate toluene with isoamyl acetate. When these were used to react with the cellulose casing as before the 150 parts per million solution gave a hydrophobic surface while that obtained with the 75 parts per million DDM solution was much less so. Four lengths of casing four feet long were treated with each of the above solutions.

DDM reacted casing was coated with 1000-centipoise saran from an eight percent solution in methyl ethyl ketone. The coated casings were air dried over night and dried at 135° C. for 25 minutes the next morning. The adhesion of the saran to the modified casings and to the non-undercoated controls was estimated by boiling coated pieces in tap water for three hours and attempting removal of the coating with Scotch tape. About 20 tests with 1 x 4 inch tape were performed on each type of coating.

| Sample | Average Coating Removed, Percent | Range, Percent |
|---|---|---|
| 1. Casing treated with 600 p.p.m. DDM | 8 | 0–40 |
| 2. Casing treated with 300 p.p.m. DDM | 3 | 0–10 |
| 3. Casing treated with 150 p.p.m. DDM | 50 | 15–80 |
| 4. Casing treated with 75 p.p.m. DDM | 100 | |
| 5. Control Casing with no DDM | 100 | |

*Example XVIII*

A solution of 500 parts per million of DDM was made in n-amyl acetate. Other casings were dipped into this solution, the solvent was evaporated and the casings were heated at 135° C. for three minutes. All casings became hydrophobic. It was noted that the casings were not hydrophobic on their interiors. It was further noted that they could be extracted with water and dried several times and the surface remained hydrophobic.

Adhesion tests were conducted as in Example XVII:

| Sample | Average Coating Removed, Percent | Range, Percent |
|---|---|---|
| A | 1.5 | 0–5 |
| B | 17.0 | 3.35 |
| C | 0 | |

For the adhesion tests the casings were coated with Saran as in the prior example, but they were force-dried for 25 minutes at 135° C. The same day they were coated.

*Example XIX*

This is an example of the use of alpha-naphthyl isocyanate as the surface modifying reagent. One milliliter of alpha-naphthyl isocyanate was dissolved in 200 grams of methyl isobutyl ketone. The solution was poured into an evaporating dish and several three-foot lengths of fibrous casing were dipped through and allowed to drain. They were air dried at room temperature and divided into two groups. One group was heated at 135° C. for three minutes while the other was heated for four minutes. The surfaces of both groups of casing became hydrophobic with an instantaneous contact angle of about 70° with water drops. A drop of water of 0.05 milliliter spread over an area about 0.6 centimeter square. While the casing did not immediately pucker up or crawl around the drop a thin line on the casing could be seen when the drop was blotted off immediately after placement. The drop required about five minutes to wet and start to soak into the casing.

A 0.1 percent solution of alpha-naphthyl isocyanate was similarly prepared and used to undercoat the casing with a heating time of four minutes.

In this instance a somewhat less hydrophobic coating was obtained in that a water drop of 0.05 milliliter spread over an area of about one centimeter square and began to wet the casing in about 40 seconds. It showed an immediate contact angle of about 30°.

*Example XX*

A casing which has been undercoated with 0.59 percent alpha-naphthyl isocyanate from isoamyl acetate was coated with Saran organosol using wiper rods. The coated casing was dried as above and gave a 0.3 mil coating. When the Scotch tape adhesion was tested after the water boil, only five percent of the area of the coating was removed. Rub and scratch resistance were excellent.

*Example XXI*

This is an example of the use of vinyl chlorideacrylonitrile copolymer as the hydrophobic polymer coating. "Vinyon N," a product of the Bakelite Division of Union Carbide and Carbon Corporation was obtained. One hundred grams of the powder were dissolved in acetone to make a 7.6 percent solution. The material dissolved slowly to make a dark amber viscous solution. A General Electric Zahn No. 2 cup indicated a viscosity of about 180 centipoises. Wiper rods had to be used with a coating solution of this viscosity to obtain 0.2 to 0.3 mil coatings.

Three samples of casing were undercoated with 1.18 percent, 0.59 percent and 0.1 percent solutions of alpha-naphthyl isocyanate in methyl isobutyl ketone. A heating time of three minutes at 135° C. was used. The undercoated casing was coated with the "Vinyon N" resin by dipping and wiping. It was dried at 130 to 135° C. for 25 minutes and coating adhesion was tested immediately.

| Casing | Coating Adhesion |
| --- | --- |
| 1. 1.18% undercoated Vinyon N coated. | Average 75 percent coating was removed. Excellent rub and scratch resistance. |
| 2. 0.59% undercoated Vinyon N coated. | Average 25 percent coating was removed. Range 0-60 percent. Excellent scratch and rub resistance. |
| 3. 0.1% undercoated Vinyon N coated. | Average 40 percent coating was removed. Good scratch and rub resistance. |
| 4. 0.1% undercoated Vinyon N coated. Coating heated 35 minutes instead of the usual 25 minutes at 130° C. | Five percent of coating was removed. Excellent scratch and rub resistance. |

*Example XXII*

This is an example of bonding rubber hydrochloride (Pliofilm) to fibrous sheeting. Fibrous casing was made hydrophobic on its surface by reacting with p,p'-diisocyanatodiphenylmethane using a 500 parts per million solution. It was then coated with an approximately 0.35 mil coating of Pliofilm by dipping in four percent toluene solution, air dried for one hour and force dried at 110° C. for ten minutes. There was no coating sloughing upon exposure to cold water for 24 hours or to water at 85-90° C. for three hours. The fibrous casing had good scratch and rub resistance after the boil.

*Example XXIII*

This is an example of bonding a chlorinated rubber such as "Parlon" to fibrous casing made hydrophobic by undercoating with reaction products of diisocyanate diphenylmethane. This was done by immersing the casing for one second in a 600 part per million solution of diisocyanatodiphenylmethane in a mixed solvent, air drying for five minutes and passing continuously into an oven held at 135° C. The casing was exposed for two and a half minutes to this temperature. The mixed solvent used for the reagent was a 3:1 mixture of isoamyl acetate and toluene.

Pieces of treated and untreated casing were coated with 0.3 to 0.4 mil coatings of unplasticized 125-centipoise grade "Parlon." The casings were coated by dipping into a ten percent solution of the "Parlon" in methyl ethyl ketone. Three-foot lengths of coated casing were allowed to drain vertically for fifteen minutes, and then were force dried at 130° C. for one and a half minutes. Both types of coated casing were placed in tap water at 70° C. after they had been cut into five-inch cylinders and slit. The coating sloughed off the untreated casing in less than one minute. The coating on the undercoated casing had not sloughed off after two hours in tap water at 70° C. and only small shreds of the coating could be rubbed off. In the dry state the coating was 100 percent removed from the untreated film and about 30 percent from the undercoated film using Scotch tape. After hot water immersion for two hours the coating could be completely removed from the undercoated casing with Scotch tape.

The "Parlon" film has an elongation of about 3.5 percent. Consequently, when the wet cellulose casing was stretched the film crazed, and could be easily rubbed off. Islands of coating appeared to adhere to the casing.

In an effort to observe the effect of a plasticizer on the coating adhesion and to increase coating elongation, a "Parlon" film containing 20% dibutylphthalate plasticizer was coated on both untreated and diisocyanatodiphenyl-methane undercoated cellulose films. The "Parlon" coating on the untreated casing sloughed off in two minutes when the film was placed in water at 20° C. and in less than one minute in water at 70° C.

On the other hand, the "Parlon" coating on the diisocyanatodiphenyl undercoated casing did not slough off when placed in cold water at 15° C. for one hour, hot water at 70° C. for two hours, or boiling water for one hour. The coating blushed in the boiling water. In the plasticized state the coated casing could be stretched 10 to 14% before a turbidity appeared in the casing and evidence for "islanding" or checking arose. The plasticized "Parlon" casings could be removed completely with Scotch tape in dry or wet states.

Coating thicknesses on the undercoated casings were estimated by thickness measurements on free films sloughed from the control casing coated under similar conditions to the undercoated casings. Carson micrometer measurements on these free films averaged 0.34 mil with a range of 0.3 mil to 0.4 mil.

Cellulose nitrate, cellulose acetate and ethyl cellulose as film formers are major components of protective, decorative or barrier coatings. They are used along with waxes, dyes, resins, plasticizers and pigments in important coating outlets. Attempts were therefore made to bond such materials to cellulosic films. It was found that p,p' diisocyanatodiphenylmethane undercoatings markedly improve adhesion of both plasticized and unplasticized cellulose nitrate and ethyl cellulose to cellulose casings. Stearyl isocyanate undercoating improved adhesion only slightly. Toluene diisocyanate and diisocyanatodiphenylmethane undercoatings had only slight effect on the adhesion of cellulose acetate to fibrous casings.

*Example XXIV*

Hercules Type AS nitrocellulose, viscosity five second, was received wet containing 30 percent ethanol. This material was dissolved in acetone to make a four percent solution. Enough di-n-butyl-phthalate was added so that a film containing 17 percent plasticizer would be deposited.

When untreated and diisocyanatodiphenylmethane-undercoated fibrous casings were coated by dipping into this solution, the coatings blushed as they dried. The coated casings were allowed to air-dry for two hours. They were then tested for coating adhesion by immersion in both cold water and boiling tap water. Plasticized nitrocellulose coating on the untreated casing sloughed off in cold water in five minutes. The coating on the diisocyanatodiphenylmethane-undercoated casing resisted two hours in boiling tap water. Scotch tape removed about ten percent of the coating after the boil. Scratch resistance was good.

*Example XXV*

To eliminate blushing in these coatings a "retarder" was added to the acetone solution. This higher boiling solvent was methyl isobutyl ketone. The coating dope became about three percent nitrocellulose in a solvent 1:24:75 ethanol:methyl isobutyl ketone:acetone.

Untreated casings and diisocyanatodiphenylmethane-undercoated casings were coated by dipping as before to give a 0.21 mil coating which had not blushed. Slit cylinders of the two coated casings were placed in cold water and in hot (95° C.) tap water. The nitrocellulose coating sloughed from the control or untreated casing in three minutes in cold water and in one minute in hot water. On the other hand, the diisocyanatodiphenylmethane-undercoated nitrocellulose did not slough off in cold water after 24 hours and in hot water (95° C.) after four hours. It showed good scratch resistance and a Scotch tape removal averaging ten percent after the hot water test.

*Example XXVI*

An 11.6 percent solution of Hercules Type AS nitrocellulose, viscosity five seconds, in a solvent consisting of 94.4 percent ethyl acetate and 5.6 percent ethanol was prepared. No plasticizer was added.

Untreated fibrous casing and one undercoated with diisocyanatodiphenylmethane were coated by dipping and were permitted to air-dry over night.

The two coated casings were placed in hot (95° C.) tap water as slit five-inch cylinders. The unplasticized coating on the control casing sloughed off in one minute. The coating on the diisocyanatodiphenylmethane-undercoated casing had not sloughed off after three hours of boiling in tap water. The coating began to lift around the corners after four hours at boil. The coating did not blush on either control or diisocyanatodiphenylmethane-undercoated casing. Scratch resistance was good and the diisocyanatodiphenylmethane-undercoated casing could be stretched eight percent without delamination.

*Example XXVII*

Hercules ethyl cellulose Type N-22 was obtained which has an ethoxy content of 47.7 percent and a viscosity of 20 centipoises. It was dissolved in methyl ethyl ketone to make a five percent solution and enough di-n-butylphthalate was added so that the deposited ethyl cellulose film would be 30 percent plasticizer.

Both control and diisocyanatodiphenylmethane-undercoated fibrous casings were coated by dipping with this dope and the coating allowed to air-dry over night.

The two types of coated film were placed in boiling water. The coated control coating immediately sloughed off. The coating on the diisocyanatodiphenylmethane-undercoated casing began to blush in about ten minutes. After two hours in boiling tap water the coating had not sloughed off, and it could not easily be removed by scratching. It could be more easily removed after the casing was stretched 30 percent. The film was slightly tacky at boiling water temperature. Scotch tape removal of coating after the water boil averaged 25 percent with a range of 10 to 60 percent.

*Example XXVIII*

This is an example of coating fibrous casing with wax nitrocellulose layers. A fortified wax was made by melting 5.6 grams of Eastman Epolene N with 112 grams of paraffin wax, melting point 54–56° E. The Epolene N is a polyethylene wax in the 2000–4000 molecular weight range and has an acid number of 9–10. Addition of it to paraffin raised the melting point to about 65° C.

A coating dope was prepared as follows:

| | Gm. |
|---|---|
| Hercules AS-5 nitrocellulose | 25 |
| Dibutyl phthalate | 11.7 |
| Modified paraffin wax | 2.8 |
| Damar resin | 3.5 |
| Ethyl acetate | 159.0 |
| Xylene | 73.0 |

This coating composition was used to coat toluene diisocyanate undercoated fibrous casing at room temperature using a doctor blade setup. A uniform coating of 0.10 to 0.14 mil thickness was obtained after a five-minute heating at 90° C. and an overnight air-dry. The undercoating was obtained by passing the casing through an 0.25 percent solution of toluene diisocyanate in monochlorobenzene, draining, air drying five minutes and heating five minutes at 90° C. It was noted that undercoated casing could be boiled in tap water for three hours or stored in tap water at room temperature for three weeks with no sloughing of the coating. The rub and scratch resistance were still good and the Scotch tape removed an average of ten percent of the coating after immersion.

*Example XXIX*

Samples of fibrous casings were obtained and wet-out in warm tap water. They were wiped between glass rods so that they had a surface moistness comparable to casing in process after passing the glycerol tank wiper rods.

Four hundred grams of toluene was made 0.25 percent in toluene diisocyanate and the 20-foot lengths of the casings were dipped through the solution. A small stainless steel tank with a wooden bottom roller was used. The casings were allowed to stand at 25° C. for five minutes before placing them in an oven at 95 to 105° C. The casings became hydrophobic with water contact angles (advancing) of 80 to 90°.

The undercoated casings were coated with Saran resin and heated at 140 to 150° C. for six minutes. First attempts to coat were by dipping into an eight percent solution of Saran F-120 in methyl ethyl ketone. The room temperature was at 28° C. This elevated temperature caused blushing of the coating. Methyl isobutyl ketone was added to the coating dope as a retarder. This eliminated the blushing.

The coated casings were allowed to stand over night. When tested for coating adhesion after a three-hour tap water boil by the Scotch tape test, the results were good as were also their rub and scratch resistance. No sloughing in the tap water boil was noted.

*Example XXX*

Eight in. wide cellophane film was dipped through a solution of 0.5 percent 2,4-tolylene diisocyanate in carbon tetrachloride. The coated film was allowed to drain vertically for five minutes under ambient conditions and then heated at 100° C. for five minutes. Pure water drops had a contact angle of about 80° on the surface and required about one minute to wet through. The film was allowed to stand one week under ambient conditions. The undercoated film was coated with a seven per cent solution of Saran resin in a suitable solvent by dipping. After an air dry for five minutes the polymer coating was baked for six minutes at 135–150° C. The coated cellophane was cut into two-inch strips to allow water to gain access to the interior and portions were placed in tap water for three hours at 95–98° C. No sloughing of the coating was noted. When the surface was rapidly blotted dry after removal from the hot water and a one-inch clear Scotch tape affixed and rapidly pulled off the coated film, an average of 5% of the coating was removed in twenty trials. After a two-month storage of the coated film in tap or city water or deionized water at room temperature, no sloughing was noted and about five per cent of the coating could be removed with Scotch tape.

*Example XXXI*

Four diisocyanate and one triisocyanate were made by slowly adding a pure diamine or glycol or a solution thereof to a rapidly stirred 2,4 tolylene diisocyanate. The mole ratio was two of the diisocyanate to one amine or glycol for making the diisocyanate and three diisocyanate to one mole glycerol for making the triisocyanate. One ends up primarily with a urethane or urea that has essentially free isocyanate groups on a larger molecule. A small amount of polymer also forms. Heat is evolved and induction periods were noted for the urethane formation. The isocyanates formed were then used to undercoat cellophane film at high enough temperatures and heated for long enough times so that essentially no free isocyanate remained in the cellulose surface.

Example XXXII 0.5 percent solution of meta-nitrophenyl isocyanate was made in carbon tetrachloride. Cellophane film was dipped through this solution, drained vertically and ten minutes later 50-foot lengths were heated at 120° C. for three minutes. After the film was allowed to stand over night, the initial advancing contact angle of water on the film was 80°. Water wet through the surface film in about one minute. A distinct "water mark" could be seen on the film surface if a water drop was placed on and removed 20 seconds later. The undercoated film was coated with 200-centipoise saran resin in methyl ethyl ketone by dipping to give a 0.20 mil coating. When the coating adhesion was tested with Scotch tape after a three-hour heating in city water at 95° C. no coating sloughing was noted and the average coating removal was 60 per cent.

Example XXXIII

P-phenylene diamine and 2,4-tolylene diisocyanate were reacted in a 2:1 mole ratio. This new isocyanate still contains two isocyanate groups per molecule. A slightly warmed solution of 7.48 grams of the diamine in chloroform was added with rapid stirring to 24 grams of the diisocyanate. About 200 grams solvent was used. Heat was evolved and a major part of the product precipitated. The slurry was allowed to stand at room temperature for 24 hours. A portion of the uniform slurry was added to carbon tetrachloride to make a 0.2% solution of the solid. This solution was used to treat cellophane film as in Example XXX. The undercoated film was held three days and coated and tested. Similar results were obtained.

Example XXXIV

Pure, just molten hexamethylene glycol (29.5 grams) was added slowly with stirring to 87.5 grams of tolylene 2,4-diisocyanate. An induction period within which no heat was evolved was noted. The flask was then cooled to keep the temperature at about 60° C. A brownish liquid resulted which solidified slowly over the day. Benzene was added to make a 50% solution which was liquid at room temperature.

An 0.5% solution in benzene of this new diisocyanate was made and cellophane film dipped as before. The air dry film was very tacky, but the baked film was non-tacky at room temperature. When the undercoated film was Saran-coated as in Example XXX, about 30% coating was removed in the adhesion tests. The adhesion of "Parlon", "Pliofilm", cellulose nitrate, and ethyl cellulose layers to the undercoated film was also promoted.

Example XXXV

Similarly, 43.36 grams of pure ethylene glycol was added drop by drop to 235 grams of tolylene diisocyanate over a 70 minute period. No heat was evolved for 15 minutes, then the flask become so hot it could not be touched. A red-brown liquid resulted which solidified to an amber solid. While liquid, threads of material could be removed with a stirring rod. This indicated formation of small amounts of polymer from the slight excess of glycol used.

A 50% solution of the product in acetone was liquid at room temperature, but one week later had started to gel. This was probably due to traces of water in the acetone and to the fact that the acetone is a slightly enolizable compound.

An 0.5% solution was made by diluting the acetone solution with benzene. This was used to undercoat cellophane film as before. The air-dry undercoated film was not so tacky as was the film undercoated with the hexamethylene glycol urethane. The baked film was non-tacky. When coated and adhesion tested, similar results were obtained as in Example XXX.

Example XXXVI

Similarly, 20.10 grams of pure (98–100%) ethylene diamine was slowly added to rapidly stirred 174.2 grams of tolylene diisocyanate. Here no appreciable induction period was noted. Heat was evolved, and the product solodified when cold. A solution of 0.5% was made up in anhydrous ethyl acetate and a cellophane film was dipped through and treated completely as in Example XXX. Similar results were obtained.

Example XXXVII

A urethane type of triisocyanate was made by slowly adding 9.3 grams of essentially anhydrous glycerol to 52.5 grams of "Mondur TDS" (a mixture of 2,4 and 2,6-tolylene diisocyanate with about 95% of the 2,4 isomer present). After an induction period of about ten minutes, a large amount of heat was evolved, and the amber solution solidified as the temperature fell below 60° C. The product was soluble in benzene. An 0.5% solution was made in benzene and cellophane film was treated analogously to Example XXX with about 5% of the coating being removed in the Scotch tape adhesion test.

The temperature at which the isocyanate undercoating may be carried out may be varied widely. Basic catalysts may be used as is well known in the art. Generally, with most cellulosic materials, any isocyanate present will be destroyed by the large excess of active hydrogen compounds present in the cellulose film.

From the foregoing description, it will be seen that all of the objects and advantages recited for my invention can be obtained in a convenient, simple and practical manner.

Having thus described my invention, I claim:

1. A coated substrate consisting essentially of a hydrophilic first layer of cellulose fibres impregnated with regenerated cellulose and having a thin layer of hydrophobic thermoplastic polymer bonded in direct contact to a surface of said first layer which has been reacted with an organic isocyanate to a superficial depth such as to be accompanied by an increase in film weight of 0.1 to 0.001%, said reacted surface of the hydrophilic layer being hydrophobic, said coated substrate being free of unreacted organic isocyanate and said polymer being free of reaction products thereof with organic isocyanate.

2. A coated substrate according to claim 1 wherein the hydrophobic polymer is a vinyl chloride-acrylonitrile copolymer.

3. A coated substrate according to claim 1 wherein the hydrophobic polymer is a vinyl chloride-vinylidene chloride copolymer.

4. A coated substrate according to claim 1 wherein the hydrophobic polymer is vinylidene chloride-acrylonitrile copolymer.

5. A coated substrate according to claim 1 wherein the hydrophobic polymer is vinyl chloride-vinyl acetate copolymer.

6. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin layer of hydrophobic organic material adhering directly to said reacted surface, said organic material being essentially free of reaction products thereof with organic isocyanate and said laminate being free of the unreacted compound.

7. A laminate according to claim 6 wherein the compound reacted with the surface of the hydrophilic cellulosic layer is toluene diisocyanate.

8. A laminate according to claim 6 wherein the compound reacted with the surface of the hydrophilic cellulosic layer is diisocyanatodiphenylmethane.

9. A laminate according to claim 6 wherein the compound reacted with the surface of the hydrophilic cellulosic layer is stearyl isocyanate.

10. A laminate consisting essentially of a hydrophilic cellulosic layer having a hydrophobic surface resulting from an in situ combining therewith of a compound containing at least one —X=C=Y group wherein X is selected from the group consisting of —C and N and Y is selected from a group consisting of O, S and NR wherein R is selected from the group consisting of hydrogen and monovalent hydrocarbon radicals, and a thin layer of rubber hydrochloride directly adhering to said hydrophobic surface and free of reaction products thereof with said compound, said laminate being free of the uncombined compound.

11. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface of the hydrophilic cellulosic layer being hydrophobic, and a thin layer of Saran in direct contact with and adhering to said reacted surface, said laminate being free of the unreacted compound and the reaction products of said compound with the Saran layer.

12. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin layer of "Vinyon" in direct contact with and adhering to said reacted surface, said laminate being free of the unreacted compound and the reaction products of said compound with the "Vinyon."

13. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin layer of polyethylene in direct contact with and adhering to said reacted surface, said laminate being free of unreacted compound and reaction products of said compound with polyethylene.

14. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin layer of chlorinated rubber in direct contact with and adhering to said reacted surface, said laminate being free of unreacted compound and reaction products of said compound with the chlorinated rubber layer.

15. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin layer of hydrophobic organic material selected from the group consisting of cellulose nitrate, cellulose acetate and ethyl cellulose in direct contact with and adhering to said reacted surface, said laminate being free of unreacted compound and reaction products of said compound with the organic material layer.

16. A laminate consisting essentially of a hydrophilic cellulosic layer having a surface reacted with a compound containing at least one —X=C=Y group wherein X is selected from the group consisting of —C and N and Y is selected from a group consisting of O, S and NR wherein R is selected from the group consisting of hydrogen and monovalent hydrocarbon radicals, said reacted surface being hydrophobic, and a thin hydrophobic layer of wax nitrocellulose in direct contact with and adhering to said reacted surface, said laminate being free of unreacted compound and reaction products of said compound with the wax nitrocellulose layer.

17. In the process of coating a hydrophilic cellulosic base, the steps which consist of applying compound to a surface of a normally hydrophilic cellulosic base, which compound is of the class containing —X=C=Y wherein X is selected from the group consisting of N and —C and Y is selected from the group consisting of O, S and NR wherein R is selected from the group consisting of hydrogen and monovalent hydrocarbon radicals, maintaining conditions under which the compound will react with the surface of said cellulosic base, continuing the reaction until substantially no unreacted compound remains so as to form a hydrophobic surface on said hydrophilic base to which a coating of hydrophobic polymer will directly bond, controlling the depth of modification of the surface of the cellulosic base so as to increase the weight of the base by only from 0.1 to 0.001% so that essentially only the surface of the base is modified from its normally hydrophilic character, and applying a coating of hydrophobic polymer to said reacted surface.

18. In the process of coating a hydrophilic cellulosic base, the steps which consist of modifying the surface characteristics of a normally hydrophilic cellulosic base by first bathing the surface of the cellulosic base with a dilute solution of organic isocyanate and solvent, then heating the treated base in ambient air and at a temperature to remove the solvent and to react the organic isocyanate with the cellulosic surface, the heating being continued until essentially all the organic isocyanate has been reacted therewith so as to form a hydrophobic surface on said hydrophilic base to which a coating of hydrophobic polymer will bond, controlling the depth of modification of the surface of the cellulosic base so as to increase its weight by only from 0.1 to 0.001% whereby essentially only the surface of the base is modified from its normally hydrophilic character, and applying a coating of hydrophobic polymer to said reacted surface.

19. In the process of bonding hydrophobic polymeric material to a hydrophilic cellulosic base film, the steps which consist of treating a surface of the film while in a moist state with a solution of low water-soluble organic solvent containing from 10.0 to 0.005% weight of organic isocyanate, baking the film at a temperature and for a time interval sufficient to completely react the organic isocyanate with the surface material of the film so as to impart a hydrophobic character to the surface of the film, the depth to which the organic isocyanate penetrates the cellulosic base being so restricted that the reaction adds from 0.1 to 0.001% to the weight of the film whereby essentially only the surface of the hydrophilic base assumes hydrophobic characteristics, and when completely reacted subsequently coating the treated surface with a thin layer of the hydrophobic polymer.

20. In the process according to claim 19 wherein the concentration of organic isocyanate in the solvent is in the vicinity of roughly one percent.

21. A film consisting essentially of a hydrophilic cellulosic base having a surface reacted to a superficial depth with compound containing at least one —X=C=Y group wherein X is selected from the group consisting of —C and N and Y is selected from the group consisting of O, S and NR wherein R is selected from the group consisting of hydrogen and monovalent hydrocarbon radicals, said reacted surface being hydrophobic and essentially devoid of such unreacted compound, the reaction products of said compound adding between 0.1 and 0.001% to the weight of the film, said film other than its said reacted surface being hydrophilic.

22. A flexible tube consisting essentially of a regenerated cellulosic base having an organic isocyanate-reacted surface, said surface being hydrophobic and essentially devoid of free isocyanate, and said isocyanate reacted surface adding from about 0.1 to 0.001% to the weight of the film, and said film other than its reacted surface being hydrophilic.

23. A flexible sheet consisting essentially of a base of cellulose fibers impregnated with regenerated cellulose and having a hydrophobic organic isocyanate reacted surface, said sheet being essentially devoid of unreacted isocyanate, said isocyanate reacted surface adding from about 0.1 to 0.001% to the weight of the film, said film other than its said reacted surface being hydrophilic.

24. A flexible lamination having good strength, shape retention without stretching and resistance to moisture vapor and oxygen transmission consisting essentially of a film of hydrophilic cellulosic material having a superficially thin hydrophobic surface consisting of the in situ reaction products of organic isocyanate with said material, and to which hydrophobic surface a thickness of hydrophobic resin directly bonds by forces obtained other than through a chemical interaction therewith, said thickness of hydrophobic resin being free of reaction products of organic isocyanate therewith, said lamination being essentially devoid of free organic isocyanate and resistant to separation when contacted by hot and cold water.

25. A flexible lamination according to claim 24 wherein the reaction products include cellulose urethane and add by weight to from about 0.1 to 0.001% of the cellulosic film.

26. A lamination consisting essentially of a film of cellophane having a hydrophobic surface consisting of the reaction products thereof with a compound containing an —X=C=Y group wherein Y is from the group consisting of —C and N and Y is from the group consisting of O, S and NR wherein R is from the group consisting of hydrogen and monovalent hydrocarbon radicals, and a thickness of polyethylene directly contacting said reacted surface and strongly bonded thereto, said lamination being devoid of the compound in its free state, and the polyethylene being free of reaction products thereof with said compound.

27. A process of bonding polyethylene to cellophane which consist of the steps of treating at least one surface of the cellophane with a dilute solution of compound containing an —X=C=Y group wherein X is from the group consisting of —C and N and Y is from the group consisting of O, S and NR wherein R is from the group consisting of hydrogen and monovalent hydrocarbon radicals, heating the treated surface to react the compound with said surface of the cellophane, continuing the step of heating until no portion of the compound capable of reacting with the cellophane remains, the penetration of said solution being confined to the cellophane surface and so that the reaction products after baking adds from 0.1 to 0.001% to the weight of the cellophane whereby the cellophane retains its hydrophilic character other than at said surface, and then applying directly to said reacted surface a thickness of polyethylene.

28. A coated substrate consisting essentially of a first layer of active-hydrogen containing hydrophilic material having a hydrophobic surface contacted by a thin layer of hydrophobic polymer which is strongly bonded thereto, said hydrophobic surface comprising the reaction products of said hydrophilic material with organic isocyanate, and said layer of hydrophobic polymer being essentially free of organic isocyanate and reaction products of organic isocyanate with the material of said layer.

29. A coated substrate according to claim 28 wherein the hydrophobic polymer is of the class which do not contain active hydrogens in their molecular structure.

30. A coated substrate consisting essentially of a substrate of hydrophilic cellulosic material having a coating of hydrophobic polymer contacting one surface thereof and strongly adhering thereto, said one surface comprising the hydrophobic reaction products of organic isocyanate with the hydrophilic cellulosic material, said reaction products adding about 0.1 to 0.001% to the weight of the substrate, said substrate being otherwise hydrophilic, and said coating of hydrophobic polymer being essentially free of organic isocyanate and reaction products of organic isocyanate with the material of said coating.

31. A coated substrate consisting essentially of a substrate of hydrophilic cellulose fibres impregnated with regenerated cellulose and having a hydrophobic surface to which a thin layer of organic material of the class which do not contain active hydrogens in their molecular structure is directly and strongly bonded, said hydrophobic surface of the substrate consisting essentially of the reaction products of the said substrate surface with organic isocyanate including cellulose urethane said reaction products adding about 0.1 to 0.001% to the weight of the substrate.

32. A coated substrate according to claim 31 wherein the hydrophobic surface also includes reaction products of organic isocyanate with compounds contained in the substrate selected from the group consisting of glycerol, water and mixtures thereof.

33. A coated substrate consisting essentially of a first layer of hydrophilic cellulosic material having a surface thereof reacted with organic isocyanate to a superficial depth which adds about 0.1 to 0.001% to the weight of the first layer, and a thin coating of a copolymer of vinyl chloride and vinylidene chloride contacting and adhering directly to said reacted surface, said coating being free of unreacted organic isocyanate and reaction products of said organic isocyanate therewith.

34. A coated substrate consisting essentially of a first layer of hydrophilic cellulosic material having a surface thereof reacted with organic isocyanate to a superficial depth which adds about 0.1 to 0.001% to the weight of the first layer, and a thin coating of vinyl chloride-acrylonitrile copolymer directly contacting said reacted surface, and the coating itself being essentially free of unreacted organic isocyanate of reaction products thereof with organic isocyanate.

References Cited in the file of this patent

UNITED STATES PATENTS

| | | |
|---|---|---|
| 2,173,029 | Waltman et al. | Sept. 12, 1939 |
| 2,284,895 | Hanford et al. | June 2, 1942 |
| 2,370,405 | Kaase et al. | Feb. 27, 1945 |
| 2,415,839 | Neal et al. | Feb. 18, 1947 |
| 2,430,479 | Pratt et al. | Nov. 11, 1947 |
| 2,471,905 | Smith | May 31, 1949 |
| 2,698,242 | Saner | Dec. 28, 1954 |
| 2,702,773 | Penn et al. | Feb. 22, 1955 |

OTHER REFERENCES

Sommers: Progress With New Polymers, British Rayon and Silk Journal, November 1953, pages 62 and 63.